US009371005B2

(12) United States Patent
Oh et al.

(10) Patent No.: US 9,371,005 B2
(45) Date of Patent: Jun. 21, 2016

(54) BATTERY MANAGEMENT APPARATUS FOR AN ELECTRIC VEHICLE, AND METHOD FOR MANAGING SAME

(75) Inventors: Won Jin Oh, Incheon-si (KR); Sun Yong Kim, Goyang-si (KR)

(73) Assignee: LG ELECTRONICS INC., Seoul (KR)

( * ) Notice: Subject to any disclaimer, the term of this patent is extended or adjusted under 35 U.S.C. 154(b) by 591 days.

(21) Appl. No.: 13/813,517

(22) PCT Filed: Aug. 1, 2011

(86) PCT No.: PCT/KR2011/005645
§ 371 (c)(1),
(2), (4) Date: Jan. 31, 2013

(87) PCT Pub. No.: WO2012/018206
PCT Pub. Date: Feb. 9, 2012

(65) Prior Publication Data
US 2013/0127247 A1    May 23, 2013

(30) Foreign Application Priority Data

Aug. 2, 2010  (KR) .................. 10-2010-0074755

(51) Int. Cl.
| | |
|---|---|
| *B60L 1/00* | (2006.01) |
| *B60L 11/14* | (2006.01) |
| *B60L 11/18* | (2006.01) |
| *H02J 7/00* | (2006.01) |
| *H02J 7/14* | (2006.01) |
| *B60L 3/00* | (2006.01) |
| *B60L 3/04* | (2006.01) |

(52) U.S. Cl.
CPC . *B60L 1/00* (2013.01); *B60L 3/003* (2013.01); *B60L 3/04* (2013.01); *B60L 11/14* (2013.01); *B60L 11/1868* (2013.01); *H02J 7/0054* (2013.01); *H02J 7/1423* (2013.01); *B60L 2210/10* (2013.01); *B60L 2210/12* (2013.01); *B60L 2240/527* (2013.01); *B60L 2240/529* (2013.01); *B60L 2240/547* (2013.01); *Y02T 10/70* (2013.01); *Y02T 10/7005* (2013.01); *Y02T 10/7066* (2013.01); *Y02T 10/7077* (2013.01); *Y02T 10/7216* (2013.01); *Y02T 10/7233* (2013.01)

(58) Field of Classification Search
USPC .................................. 307/10.1; 323/273, 282
See application file for complete search history.

(56) References Cited

U.S. PATENT DOCUMENTS

| | | | | |
|---|---|---|---|---|
| 2008/0203975 | A1* | 8/2008 | Burlak et al. ................ | 320/161 |
| 2009/0015193 | A1* | 1/2009 | Esaka ...................... | B60K 6/28 320/103 |
| 2011/0127977 | A1* | 6/2011 | Chang .................. | H02M 3/156 323/282 |

FOREIGN PATENT DOCUMENTS

| | | | |
|---|---|---|---|
| JP | 2006280109 A | * | 10/2006 |
| JP | 2006-280109 | * | 12/2006 |

*Primary Examiner* — Rexford Barnie
*Assistant Examiner* — Xuan Ly
(74) *Attorney, Agent, or Firm* — Dentons US LLP

(57) ABSTRACT

The present invention relates to an electric vehicle, and to a method for managing the charging of an auxiliary battery for an electric vehicle. The electric vehicle according to the present invention comprises: a high voltage battery for driving the electric vehicle; an auxiliary battery for supplying a plurality of electronic loads with driving power; a converter converting the voltage of the high voltage battery to a voltage required by the electronic loads via PWM switching; and a current detection unit for detecting the output current of the converter wherein the converter includes a converter control unit for reducing the output voltage of the converter when the energy required by the loads, based on the current detected by the current detection unit, is greater than the rated capacity of the converter. Accordingly, energy supplied to the loads can be handled by the converter and the auxiliary battery so as to enable the safe operation of an electric vehicle system.

2 Claims, 4 Drawing Sheets

BATTERY MANAGEMENT APPARATUS FOR AN ELECTRIC VEHICLE, AND METHOD FOR MANAGING SAME

TECHNICAL FIELD

The present invention relates to an apparatus and method for controlling a battery of an electric vehicle, and more particularly to an apparatus and method for controlling a battery of an electric vehicle, which can supply power of an auxiliary battery to a load by reducing an output voltage of a converter.

BACKGROUND ART

Electric vehicles (EVs) have been actively studied because they are the most promising solution to pollution and energy problems.

Electric vehicles (EVs) are mainly powered by an AC or DC motor using power of a battery. The electric vehicles are broadly classified into battery powered electric vehicles and hybrid electric vehicles. In the battery powered electric vehicles, a motor is driven using power of a battery, and the battery is recharged after stored power is consumed. In hybrid electric vehicles, a battery is charged with electricity generated via engine driving, and an electric motor is driven using the electricity to realize vehicle movement.

The hybrid electric vehicles may further be classified into serial and parallel types. In the case of serial hybrid electric vehicles, mechanical energy output from an engine is changed into electric energy via a generator, and the electric energy is fed to a battery or motor. Thus, the serial hybrid electric vehicles are always driven by a motor similar to conventional electric vehicles, but an engine and generator are added for the purpose of increasing range. Parallel hybrid electric vehicles may be driven using two power sources, i.e. a battery and an engine (gasoline or diesel). Also, the parallel hybrid electric vehicles may be driven using both the engine and the motor according to traveling conditions.

With recent gradual development of motor/control technologies, small high-output and high-efficiency systems have been developed. Owing to replacing a DC motor by an AC motor, electric vehicles have accomplished considerably enhanced output and power performance (acceleration performance and maximum speed) comparable to those of gasoline vehicles. As a result of promoting a higher output and higher revolutions per minute, a motor has achieved reduction in weight and size, and consequently reduction in the weight and size of a vehicle provided with the motor.

Energy supplied from a high-voltage battery of the electric vehicle is PWM-switched by the converter such that a battery voltage of several hundreds of V is converted into a voltage of about 12V and thus the resultant voltage is supplied to an auxiliary battery and overall load.

An output voltage of the converter is slightly higher than a normal voltage of the auxiliary battery, such that the converter can charge the auxiliary battery and at the same time can provide energy to necessary loads. Therefore, provided that the load is increased in size, not only capacity of the converter but also the size of the converter must be increased.

As a result, although the size of load is increased, rated capacity of the converter needs to remain constant.

DISCLOSURE

Technical Problem

Therefore, the present invention has been made in view of the above problems, and an object of the present invention is to provide an apparatus and method for controlling a battery of an electric vehicle in which an auxiliary battery provides energy to loads under an overload state exceeding a rated capacity of a converter, such that system operation can be continued.

Technical Solution

In accordance with one aspect of the present invention, the above and other objects can be accomplished by a battery control apparatus for use in an electric vehicle including: a high-voltage battery for driving an electric vehicle; an auxiliary battery for providing drive power to a plurality of loads; a converter for converting a voltage of the high-voltage battery into a voltage needed for the loads through Pulse Width Modulation (PWM) switching; and a current detection unit for detecting an output current of the converter, wherein the converter includes a converter controller for reducing an output voltage of the converter when energy needed for the loads is higher than the rated capacity of the converter on the basis of the current detected by the current detection unit.

In accordance with another aspect of the present invention, a battery control method for use in an electric vehicle including a high-voltage battery, a plurality of loads, and an auxiliary battery supplying a drive power to the plurality of loads, includes: detecting an output current of a converter which converts a voltage of the high-voltage battery into a voltage needed for the loads through Pulse Width Modulation (PWM) switching; comparing energy needed for the loads with a rated capacity of the converter on the basis of the output current of the converter; and reducing an output voltage of the converter when the energy needed for the loads is greater than the rated capacity of the converter on the basis of the output current of the converter.

Advantageous Effects

In accordance with the embodiments of the present invention, an apparatus and method for controlling a battery of the electric has the following advantages. The battery control apparatus according to the present invention determines whether a converter is overloaded state by detecting a current. If a difference between a voltage of an auxiliary battery and an output voltage of a converter is reduced, the sum of a current of the converter and a current of the auxiliary battery is provided to load, such that it prevents increase of the converter size and also prevents unnecessary increase of the converter capacity, resulting in prevention of malfunction caused by overcurrent.

In addition, an output voltage of the converter is adjusted to be lower than a voltage of the auxiliary battery, or the converter stops operation, such that energy is provided to load using only the auxiliary battery. As a result, although the rated capacity of the converter is selected to be appropriate for an average load capacity in place of a peak value, the auxiliary battery provides energy to load, such that an overload state is eliminated and thus system operation can be continued.

In accordance with the battery control system of the present invention, the auxiliary battery shares energy requested by load. Although system specification becomes complicated and system functions have become more diverse such that energy required for load increases, capacity of the converter need not be unnecessarily increased, space occupied by the converter of the electric vehicle need not be increased, the battery control system can properly cope with an overload state without increasing capacity of the converter, and there is no need to worry about malfunction caused by overcurrent, resulting in increased reliability of the electric vehicle.

DESCRIPTION OF DRAWINGS

The above and other objects, features and other advantages of the present invention will be more clearly understood from the following detailed description taken in conjunction with the accompanying drawings.

BEST MODE

Embodiments of the present invention will be described below with reference to the attached drawings. The apparatus and method for controlling a battery of the electric vehicle according to embodiments of the present invention will hereinafter be described with reference to FIGS. 1 to 4.

The terms "module" and "unit" used to signify components are used herein to aid in the understanding of the components and thus they should not be considered as having specific meanings or roles. Accordingly, the terms "module" and "unit" may be used interchangeably.

Figure 1:
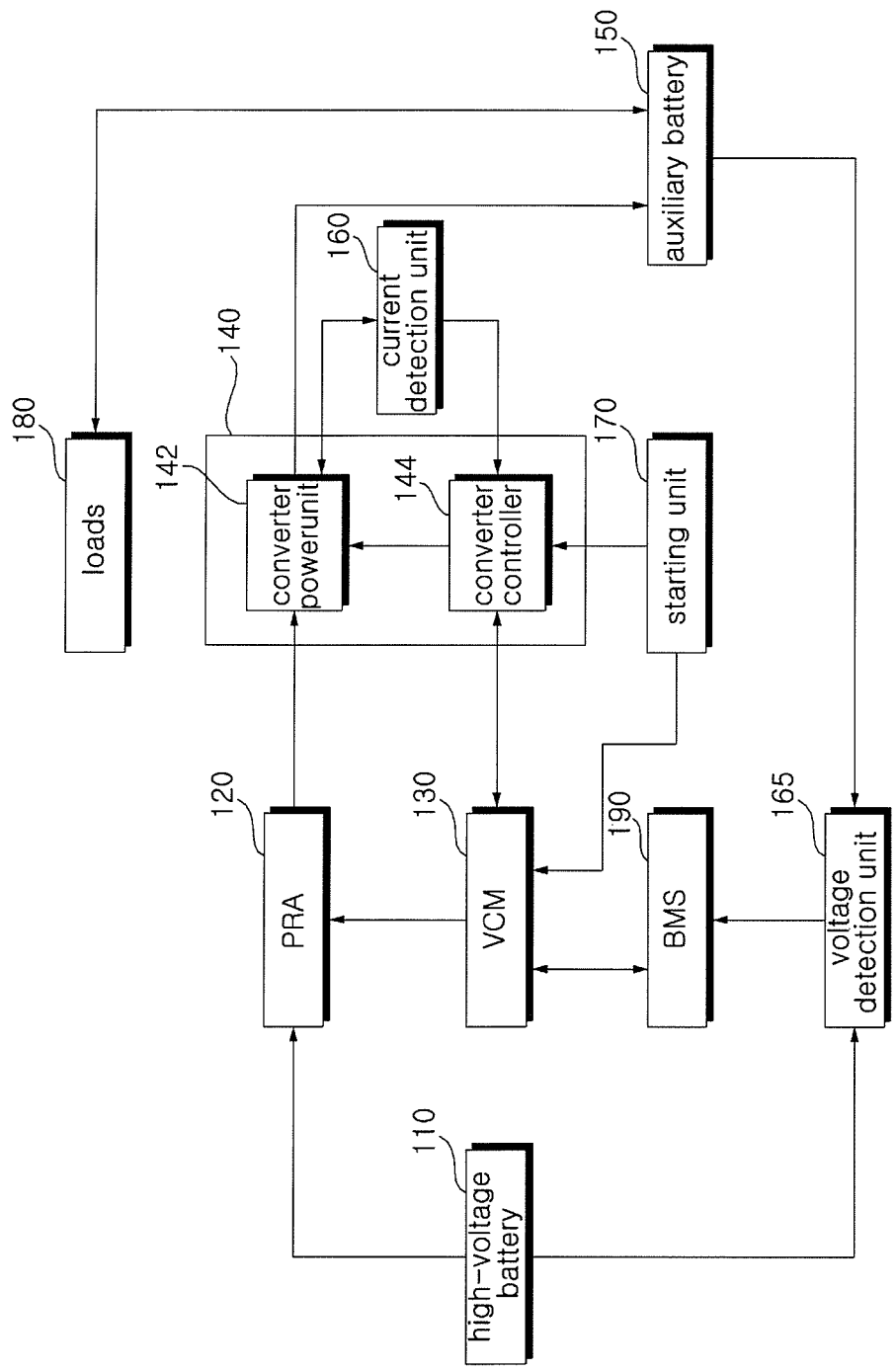
FIG. 1 is a block diagram illustrating constituent components of an electric vehicle according to an embodiment of the present invention.

FIG. 1 is a block diagram illustrating constituent components of an electric vehicle according to an embodiment of the present invention.

The electric vehicle according to an embodiment of the present invention will be described below with reference to FIG. 1 in terms of functional components thereof.

The electric vehicle includes a high-voltage battery 110, a power relay assembly (PRA) 120, a vehicle control module (VCM) 130, a converter 140, an auxiliary battery 150, a current detection unit 160, a starting unit 170, a load 180, and a battery management system (BMS) 190.

In actual implementation, two or more of these components may be incorporated into a single component, or one component may be configured separately as two or more components, as needed.

The high-voltage battery 110 includes a plurality of batteries to store high-voltage electric energy. The high-voltage battery 110 is charged with electricity upon receiving power from a charging station, a vehicle charging installation, a home or an external part.

The high-voltage battery 110 is coupled to a converter power unit 142 of the converter 140 while interposing the power relay assembly (PRA) 120 therebetween, so that it can provide energy to the converter. A driving power source, as a main power-supply source for providing energy needed to drive the electric vehicle or energy needed for driving loads, is supplied to the vehicle control module (VCM) 130 through the battery management system (BMS) 190.

The power relay assembly (PRA) 120 is comprised of a switching element. Although the power relay assembly (PRA) 120 is implemented as a relay for connecting the high-voltage battery 110 to a converter power unit 142 of the converter 140, the scope or spirit of the present invention is not limited thereto, and the relay may also be comprised of a semiconductor circuit or a bimetal switch as necessary.

The PRA 120 is operated under the control of the vehicle control module (VCM) 130. The PRA 120 may switch a plurality of relays upon receiving an output signal from the vehicle control module (VCM) 130.

Specifically, when the vehicle starts or stops driving, the PRA 120 switches a plurality of relays according to a predetermined order, such that the operating power of a high voltage stored in the battery 110 can be applied to individual parts of the vehicle. If the VCM 130 is switched on, energy of the battery 110 can be applied to the converter power unit 142 of the converter 140.

Particularly, when the vehicle starts driving, the PRA 120 sequentially controls relays to prevent the operating power of a high voltage from being suddenly applied to the vehicle, so that power can be stably supplied to the vehicle.

The VCM 130 switches on or off the PRA 120 using power of the battery 110 as drive power, and can control the converter power unit 142 by communicating with the converter controller 144 of the converter 140.

The VCM 130 can receive an ignition-ON (IGN ON) signal from the starting unit 170. Upon receiving the IGN ON signal from the starting unit 170, the VCM 130 receives drive power from the battery 110 through the BMS 190, such that it can control overall vehicle driving.

The converter 140 performs PWM switching upon receiving a control signal from the VCM 130, such that a battery voltage of several hundreds of V is converted into a voltage (e.g., about 12V) needed for load.

The converter 140 may include the converter power unit 142 and the converter controller 144.

The converter power unit 142 is connected to the battery 110 while interposing the PRA 120 therebetween. If the relay of the PRA 120 is switched on, the relay receives energy from the battery 110 such that the energy can be supplied to the auxiliary battery 150.

The converter power unit 142 is controlled by the converter controller 144. The converter controller 144 controls the converter power unit 142 so that the amplitude of an output voltage of the converter power unit 142 can be adjusted. That is, the amplitude of the output voltage of the converter power unit 142 can be changed, and the output voltage of the converter power unit 142 is reduced, such that the auxiliary battery 150 may share energy supplied to load with the high-voltage battery 110 or may take full charge of energy supplied to load.

If energy needed for load is higher than a rated capacity of the converter on the basis of a current detected by the current detection unit 160, the converter controller 144 may reduce the output voltage of the converter 140.

The converter controller 144 reduces the output voltage of the converter 140 such that a voltage of the auxiliary battery 150 can be adjusted to be identical to an output voltage of the converter 140.

In this case, the converter controller 144 can provide the sum of an output current of the converter 140 and an output current of the auxiliary battery 150 to the load 180.

In addition, the converter controller 144 may control the output voltage of the converter 140 to be less than a voltage of the auxiliary battery 150. In this case, the converter controller 144 may provide the output current of the auxiliary battery 150 to the load 180. That is, energy needed for driving the load may be intermittently supplied from the auxiliary battery only. However, energy capacity of the auxiliary battery 150 is much smaller than that of the high-voltage battery 110, such that the converter controller 144 can be effectively used for solving overload encountered by excessive use of the converter 140.

If load equal to or higher than the rated capacity of the converter 140 is connected to the electric vehicle using the output voltage of the converter 140 as energy source, unexpected problems may occur in system operation of the electric vehicle. In more detail, the auxiliary battery 150 intermittently provides energy to the load connected to the converter 140, and load of the converter 140 is reduced so that system operation can be stably carried out.

If energy needed for the load 180 is greater than the rated capacity of the converter 140 on the basis of a current detected by the current detection unit 160, the converter controller 144 stops the converter 140, such that an output current of the auxiliary battery 150 can be provided to the load 180.

That is, energy used for driving the load can be intermittently supplied from only the auxiliary battery 150. However, energy capacity of the auxiliary battery 150 is much smaller than that of the high-voltage battery 110, such that the converter controller 144 can be effectively used to solve overload encountered by excessive use of the converter 140.

The output voltage of the converter 140 is used as energy source of the load 180. If a load higher than the rated capacity of the converter 140 is connected to the electric vehicle, an unexpected problem occurs in system operation. The auxiliary battery 150 intermittently provides energy to the load connected to the converter 140, such that load of the converter 140 is reduced to stably operate the system.

The converter controller 144 adjusts an output voltage of the converter 140 in such a manner that only the auxiliary battery 150 provides energy to the load 180. Thereafter, if load of the converter 140 is reduced, the converter controller 144 adjusts the amplitude of the output voltage of the converter power unit 142, such that a current applied to the load may be re-adjusted to be the sum of an output current of the converter and a current of the auxiliary battery, or may control a current applied to the load to be used as only the output current of the converter.

The converter controller 144 receives the ignition-ON (IGN-ON) signal from the starting unit 170. If the high-voltage battery 110 is connected to the converter power unit 142, the converter controller 144 can provide energy to the auxiliary battery 150 and the load 180.

Since the converter 140 must further provide energy of the high-voltage battery to the auxiliary battery 150, it considers the auxiliary battery 150 to be a kind of load.

The current detection unit 160 detects an output current of the converter 140 so that it outputs a value of the detected current.

The current detection unit 160 transmits a signal indicating the detected current value to the converter controller 144 of the converter 140.

The voltage detection unit 165 may measure the output voltage of the auxiliary battery 150 and the output voltage of the high-voltage battery 110.

The starting unit 170 may include a starting switching unit (not shown) and a starting switch driver (not shown). The starting switching unit may switch on or off connection between a key box and a vehicle accessory or connection between the battery and a wire of the vehicle. The starting switch driver (not shown) is configured to drive the starting switching unit.

The starting unit 170 may generally include not only the starting unit activated by a vehicle key, but also the starting unit of a start button.

Although the load 180 refers to electronic power steering, a water pump, an air-conditioner, a turn signal, a tail lamp, a head lamp, brushes, etc. for convenience of a driver who drives the electric vehicle or a hybrid electric vehicle, the scope or spirit of the present invention is not limited thereto, and can also be applied to other examples as necessary.

The battery management system (BMS) 190 determines the remaining battery capacity and the presence or absence of charging necessity, and performs a management operation for providing the charging current stored in the battery 110 to each part of the electric vehicle.

When charging and using the battery, the BMS 190 maintains a regular voltage difference between cells of the battery, and controls the battery not to be overcharged or overdischarged, resulting in increased battery lifespan.

The BMS 190 performs management of the use of the current so as to perform long duration traveling of the vehicle, and includes a protection circuit for supplied current.

Figure 2:
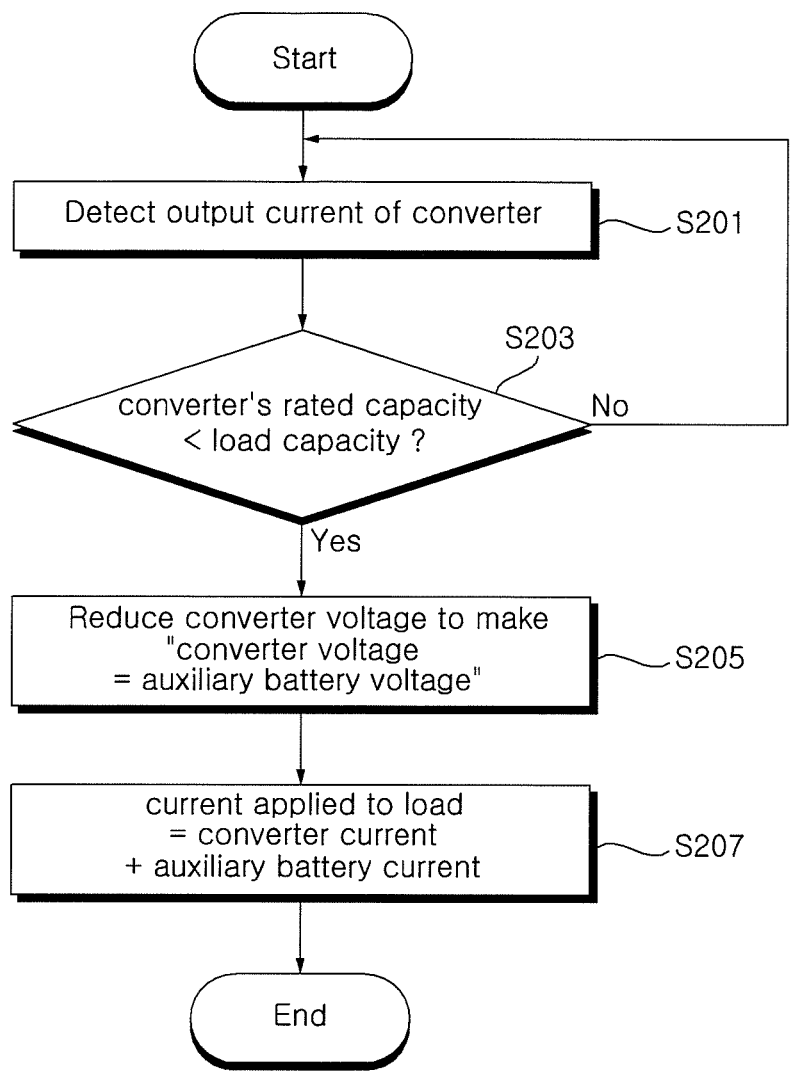
FIGS. 2 to 4 are flowcharts illustrating a method for controlling a battery of an electric vehicle according to an embodiment of the present invention.
Figure 3:
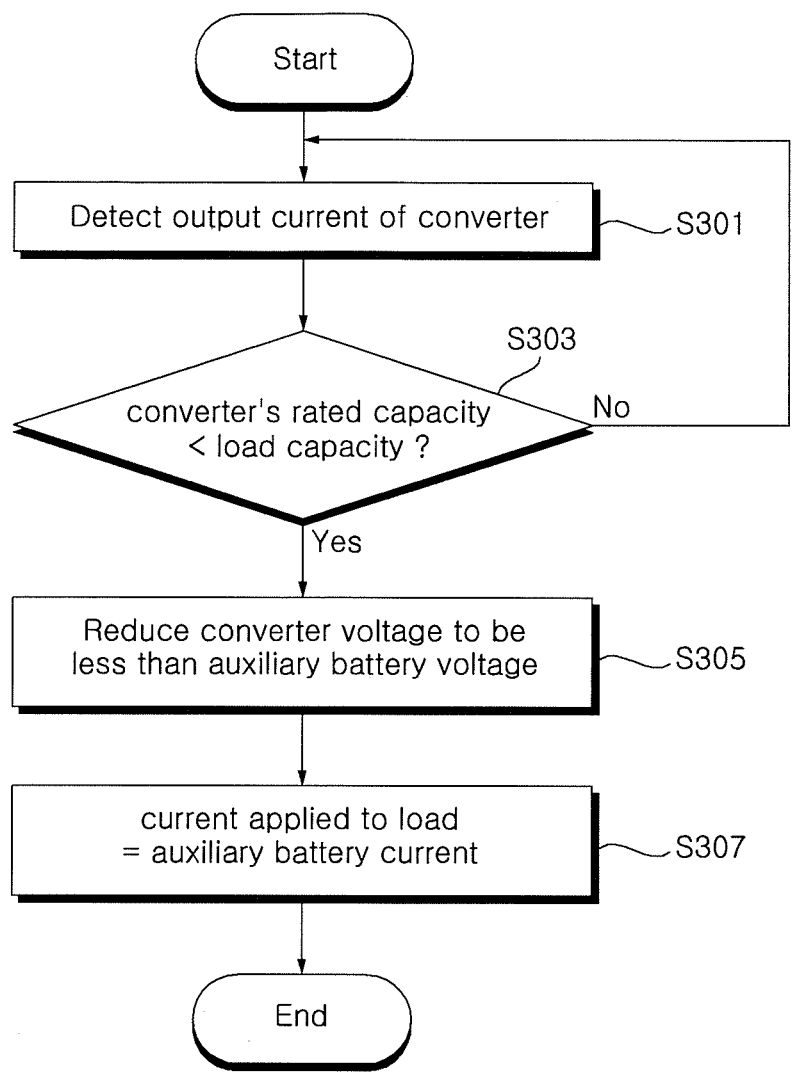
Figure 4:
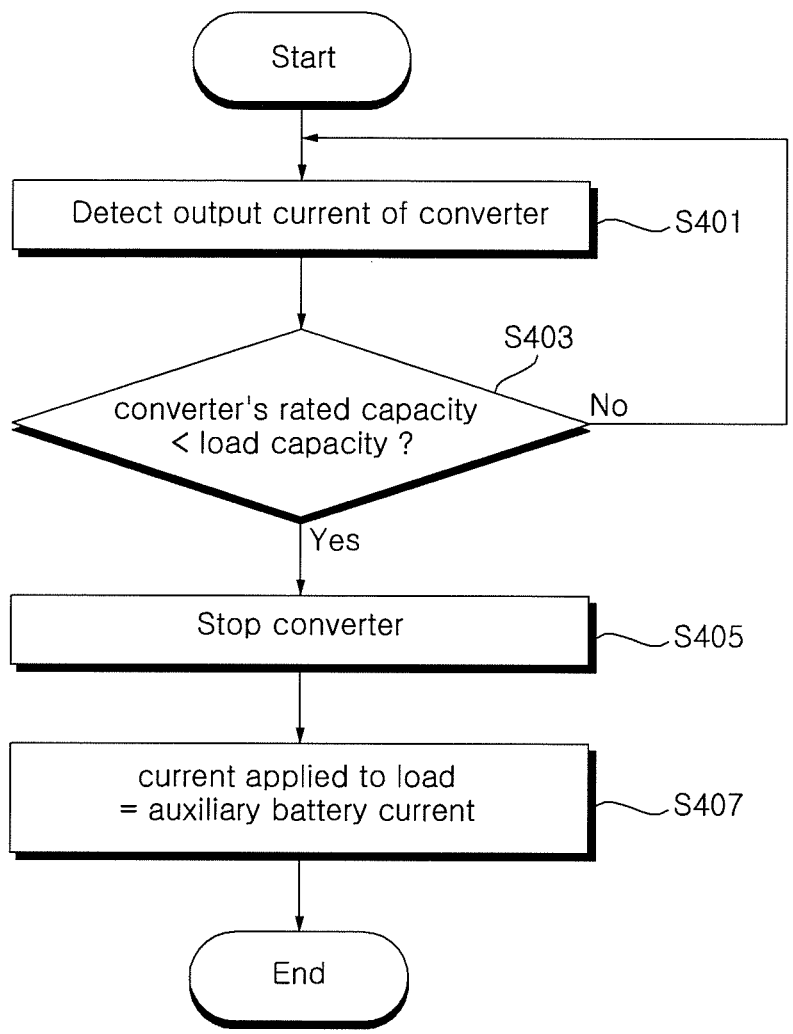

FIGS. 2 to 4 are flowcharts illustrating a method for controlling a battery of an electric vehicle according to an embodiment of the present invention.

FIG. 2 is a flowchart illustrating a method for adjusting the output voltage of the converter to be identical to a voltage of the auxiliary battery.

Referring to FIG. 2, the current detection unit 160 detects the output current of the converter power unit 142 in step S201.

It is determined whether power required for load is higher than the rated capacity of the converter 140 in step S203.

The rated capacity of the converter 140 is not designed on the basis of a peak value at which energy is needed for all loads, and is designed appropriately for average load capacity of individual loads of the electric vehicle. If the converter 140 is designed on the basis of the peak value, the converter 140 must be increased in size whereas the electric vehicle can be stably operated, such that the converter 140 is designed for average load capacity.

If power needed for load is higher than the rated capacity of the converter 140, the converter controller 144 adjusts the output voltage of the converter 140 to be identical to a voltage of the auxiliary battery 150 in step S205.

In this case, a current applied to load is identical to the sum of an output current of the converter 140 and an output current of the auxiliary battery 150 in step S207. That is, the auxiliary battery 150 intermittently provides energy to the load connected to the converter 140, and load of the converter 140 is reduced so that the system can be stably operated.

If power needed for load is less than the rated capacity of the converter 140, energy can be supplied to the load using the output current of the converter. Under this situation, the current detection unit 160 may continuously monitor the output current of the converter.

When the auxiliary battery 150 and the converter 140 simultaneously provide a current to the load, if load capacity higher than the rated capacity of the converter is further reduced, energy can be supplied to the load using only the output current of the converter. The converter controller 144 controls the converter power unit 142. If the output voltage of the converter power unit 142 is higher than a voltage of the auxiliary battery, energy can be supplied to the load using only the output current of the converter 140.

FIG. 3 is a flowchart illustrating a method for adjusting the output voltage of the converter to be lower than a voltage of the auxiliary battery.

Referring to FIG. 3, the current detection unit 160 detects the output current of the converter power unit 142 in step S301.

It is determined whether power required for load is higher than the rated capacity of the converter 140 in step S303.

The rated capacity of the converter 140 is not designed on the basis of a peak value at which energy is needed for all loads, and is designed appropriately for average load capacity of individual loads of the electric vehicle. If the converter 140 is designed on the basis of the peak value, the converter 140 must be increased in size whereas the electric vehicle can be stably operated, such that the converter 140 is designed appropriately for average load capacity.

If power needed for load is higher than the rated capacity of the converter 140, the converter controller 144 adjusts the output voltage of the converter power unit 142 to be less than a voltage of the auxiliary battery 150 in step S305.

In this case, a current applied to load is used as an output current of the auxiliary battery 150. That is, the auxiliary battery 150 intermittently provides energy to the load connected to the converter 140, and load of the converter 140 is reduced so that the system can be stably operated.

If power needed for load is not higher than the rated capacity of the converter 140, energy can be supplied to the load using the output current of the converter. Under this situation, the current detection unit 160 may continuously monitor the output current of the converter.

When the auxiliary battery 150 and the converter 140 simultaneously provide a current to the load, if load capacity higher than the rated capacity of the converter is further reduced, energy can be supplied to the load using only the output current of the converter. The converter controller 144 controls the converter power unit 142. If the output voltage of the converter power unit 142 is higher than a voltage of the auxiliary battery, energy can be supplied to the load using only the output current of the converter 140.

FIG. 4 is a flowchart illustrating a method for providing energy to the auxiliary battery by stopping the converter.

Referring to FIG. 4, the current detection unit 160 detects the output current of the converter power unit 142 in step S401.

It is determined whether power required for load is higher than the rated capacity of the converter 140 in step S403.

The rated capacity of the converter 140 is not designed on the basis of a peak value at which energy is needed for all loads, and is designed appropriately for average load capacity of individual loads of the electric vehicle. If the converter 140 is designed on the basis of the peak value, the converter 140 must be increased in size whereas the electric vehicle can be stably operated, such that the converter 140 is designed appropriately for average load capacity.

If power needed for load is higher than the rated capacity of the converter 140, the converter controller 144 stops the converter 140 in step S405.

In this case, a current applied to load is used as an output current of the auxiliary battery 150. That is, the auxiliary battery 150 intermittently provides energy to the load connected to the converter 140, and load of the converter 140 is reduced so that the system can be stably operated.

If power needed for load is not higher than the rated capacity of the converter 140, energy can be supplied to the load using the output current of the converter. Under this situation, the current detection unit 160 may continuously monitor the output current of the converter.

When the auxiliary battery 150 and the converter 140 simultaneously provide a current to the load, if load capacity higher than the rated capacity of the converter is further reduced, energy can be supplied to the load using only the output current of the converter. The converter controller 144 controls the converter power unit 142. If the output voltage of the converter power unit 142 is higher than a voltage of the auxiliary battery, energy can be supplied to the load using only the output current of the converter 140.

If load capacity higher than the rated capacity is loaded on the converter 140 which uses average load capacity as the rated capacity, the auxiliary battery 150 provides energy to the load, such that the electric vehicle can be reliably operated and the converter 140 is prevented from malfunctioning due to excess load.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A battery control apparatus for use in an electric vehicle comprising:
   a high-voltage battery for driving an electric vehicle;
   an auxiliary battery for providing drive power to a plurality of loads;
   a converter for converting a voltage of the high-voltage battery into a voltage needed for the loads through Pulse Width Modulation (PWM) switching; and
   a current detection unit for detecting an output current of the converter, wherein the converter includes;
      a converter power unit for supplying power to the auxiliary battery from the high-voltage battery;
      a converter controller for controlling the converter power unit based on the output current detected by the current detection unit,
      wherein the converter controller reduces an output voltage of the converter to supply to the loads energy from the auxiliary battery when energy needed for the loads is higher than a rated capacity of the converter power unit;
      wherein the converter controller adjusts the output voltage of the converter to supply to the loads energy from only the output current of the converter when a load of the converter is reduced,
      wherein the converter controller reduces an output voltage of the converter in a manner that the output voltage of the converter is identical to a voltage of the auxiliary battery, such that a sum of an output current of the converter and an output current of the auxiliary battery is supplied to the loads, when energy needed for the loads is higher than a rated capacity of the converter on the basis of current detected by the current detection unit.

2. A battery control method for use in an electric vehicle that includes a high-voltage battery, a plurality of loads, and an auxiliary battery supplying a drive power to the plurality of loads, the method comprising:
   detecting an output current of a converter which converts a voltage of the high-voltage battery into a voltage needed for the loads through Pulse Width Modulation (PWM) switching;
   comparing energy needed for the loads with a rated capacity of the converter on the basis of the output current of the converter;
   reducing an output voltage of the converter to supply to the loads energy from the auxiliary battery when the energy needed for the loads is greater than the rated capacity of the converter on the basis of the output current of the converter; and
   adjusting the output voltage of the converter to supply to the loads energy from only the output current of the converter, when a load of the converter is reduced,
   wherein the reducing of the output voltage of the converter includes adjusting an output voltage of the converter to be identical to a voltage of the auxiliary battery, such that a sum of the output current of the converter and the output current of the auxiliary battery is supplied to the loads.

* * * * *